United States Patent
Daniels

(10) Patent No.: US 9,611,995 B2
(45) Date of Patent: Apr. 4, 2017

(54) LIGHTING APPARATUS WITH LIGHT GENERATING DEVICE AND LUMINESCENT BODY

(71) Applicant: OSRAM GmbH, Munich (DE)

(72) Inventor: Martin Daniels, Berlin (DE)

(73) Assignee: Osram GmbH, Munich (DE)

( * ) Notice: Subject to any disclaimer, the term of this patent is extended or adjusted under 35 U.S.C. 154(b) by 0 days.

(21) Appl. No.: 14/676,832

(22) Filed: Apr. 2, 2015

(65) Prior Publication Data
US 2015/0308636 A1    Oct. 29, 2015

(30) Foreign Application Priority Data

Apr. 23, 2014   (DE) .................... 10 2014 207 664

(51) Int. Cl.
*G03B 21/20* (2006.01)
*F21S 8/10* (2006.01)
*F21V 9/14* (2006.01)

(52) U.S. Cl.
CPC .......... *F21S 48/1145* (2013.01); *F21S 48/114* (2013.01); *F21S 48/1225* (2013.01); *F21S 48/1323* (2013.01); *F21V 9/14* (2013.01); *G03B 21/204* (2013.01); *G03B 21/206* (2013.01); *G03B 21/2073* (2013.01)

(58) Field of Classification Search
CPC ....... F21K 9/56; G03B 21/204; G03B 21/206; G03B 21/2073; F21S 48/114; F21S 48/1323; F21S 48/1225; F21S 48/1145; F21V 9/14
See application file for complete search history.

(56) References Cited

U.S. PATENT DOCUMENTS

| | | | |
|---|---|---|---|
| 2012/0069593 A1* | 3/2012 | Kishimoto | B60Q 1/076 362/511 |
| 2012/0294023 A1 | 11/2012 | Nakazato | |
| 2013/0176705 A1 | 7/2013 | Ohta | |
| 2013/0271947 A1 | 10/2013 | Finsterbusch et al. | |
| 2014/0003074 A1* | 1/2014 | Kishimoto | C09K 11/0883 362/510 |

FOREIGN PATENT DOCUMENTS

DE   102012206966 A1   10/2013
DE   102012209593 A1   12/2013

OTHER PUBLICATIONS

German Search Report based on DE 10 2014 207 664.1 (7 pages) dated Feb. 16, 2015.

* cited by examiner

*Primary Examiner* — Stephen F Husar
*Assistant Examiner* — Danielle Allen
(74) *Attorney, Agent, or Firm* — Viering, Jentschura & Partner mbB

(57) ABSTRACT

In various embodiments, a lighting apparatus is provided. The lighting apparatus includes at least one light generating device configured to generate at least one polarized primary light beam; and at least one luminescent body, separated from the at least one light generating device, which can be illuminated by the polarized primary light beam. The at least one polarized primary light beam strikes a surface of the luminescent body at a Brewster angle, and is p-polarized in relation to this surface.

16 Claims, 4 Drawing Sheets ized light. Various embodiments are applicable e.g. to a lighting apparatus for a vehicle, e.g. a motor vehicle, or an image projection apparatus, for example a so-called beamer.

LIGHTING APPARATUS WITH LIGHT GENERATING DEVICE AND LUMINESCENT BODY

CROSS-REFERENCE TO RELATED APPLICATION

This application claims priority to German Patent Application Serial No. 10 2014 207 664.1, which was filed Apr. 23, 2014, and is incorporated herein by reference in its entirety.

TECHNICAL FIELD

Various embodiments relate generally to a lighting apparatus including at least one light generating device for generating at least one polarized primary light beam, and including at least one luminescent body, separated from the at least one light generating device, which can be illuminated by the polarized primary light beam. Various embodiments are applicable e.g. to a lighting apparatus for a vehicle, e.g. a motor vehicle, or an image projection apparatus, for example a so-called beamer.

BACKGROUND

During the illumination of a luminescent body with primary light, the different refractive index of the luminescent body compared to air can lead to partial reflection of the primary radiation on the luminescent material surface, which can be calculated according to Fresnel's equations. In order to suppress this Fresnel reflection, an antireflection layer may be applied onto the luminescent material surface. This is often impractical, however, since for example the material of the luminescent body surface does not allow long-lasting application of an antireflection layer. It is also known for the primary radiation to shine first through a transparent carrier for the luminescent body and only then onto the luminescent body. The side of the carrier facing away from the luminescent body may then be provided with an antireflection layer. A disadvantage in this case is that Fresnel reflections can also occur at the interface between the carrier and the luminescent body, and furthermore that the carrier can have an absorbing effect for the primary radiation.

SUMMARY

In various embodiments, a lighting apparatus is provided. The lighting apparatus includes at least one light generating device configured to generate at least one polarized primary light beam; and at least one luminescent body, separated from the at least one light generating device, which can be illuminated by the polarized primary light beam. The at least one polarized primary light beam strikes a surface of the luminescent body at a Brewster angle, and is p-polarized in relation to this surface.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
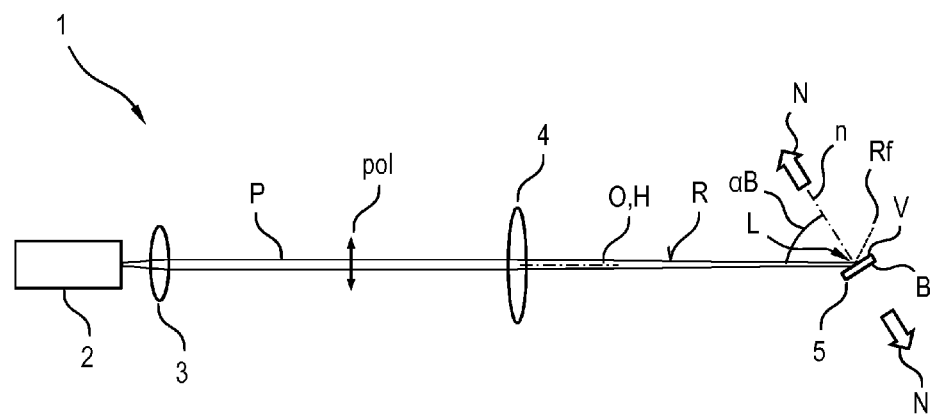
FIG. 1 shows a basic structure of a lighting apparatus according to various embodiments as a sectional representation in side view.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Various embodiments may at least partially overcome the disadvantages of the prior art, and e.g. to provide a possibility of particularly low-loss coupling of primary radiation into lighting apparatuses of the type in question.

Various embodiments provide a lighting apparatus including at least one light generating device for generating at least one polarized primary light beam, and at least one luminescent body, separated from the at least one light generating device, which can be illuminated by the polarized primary light beam. The at least one polarized primary light beam strikes a surface of the luminescent body at a Brewster angle and is p-polarized in relation to this surface.

This lighting apparatus may have the effect that any Fresnel reflection is particularly small, for example in comparison with (polarization-independent) normal incidence and in comparison with a primary light beam which is s-polarized in relation to the incidence plane. By way of example, in the case of lighting apparatuses having a reflective structure, such an undesired primary light component, leading to color distortion of the reflected useful light, may be kept small. The excitation of the luminescent body by the primary light beam may furthermore take place with lower losses since, even without antireflection treatment of the surface of the luminescent body, almost all of the radiation power may be coupled into the luminescent body. By virtue of the non-normal incidence of the suitably polarized primary light at the Brewster angle, a (more) extended light spot may furthermore be generated without further auxiliary means, which may be advantageous for example for projection applications which require a high aspect ratio of the image generated, for example 4:3 or 16:9. A maximum power density of the primary light beam on the luminescent body may furthermore be reduced by the extended nature of the light spot.

The luminescent body may include at least one luminescent material which is suitable for transforming or converting incident primary light at least partially into secondary light with a different wavelength. When there are a plurality of luminescent materials, these may generate secondary light with different wavelengths to one another. The wavelength of the secondary light may be longer (so-called down conversion) or shorter (so-called up conversion) than the wavelength of the primary light. For example, blue primary light may be converted by a luminescent material into green, yellow, orange-colored or red secondary light. In the case of only partial wavelength transformation or wavelength conversion, a mixture of secondary light and unconverted primary light, which may serve as useful light, is emitted by the luminescent body. For example, white useful light may be generated from a mixture of unconverted blue primary light and yellow secondary light. Full conversion is nevertheless also possible, with the primary light either no longer being present or being present in only a negligible amount in the useful light. A degree of conversion depends, for example, on a thickness and/or a luminescent material concentration of the luminescent material. When there are a plurality of luminescent materials, secondary light components with different spectral compositions can be generated from the primary light, for example yellow and red secondary light. The red secondary light may, for example, be used to give the useful light a warmer hue, for example so-called "warm white". When there are a plurality of luminescent materials, at least one luminescent material may be suitable for wavelength reconversion of secondary light, for example green secondary light into red secondary light. Such light wavelength-reconverted from secondary light may also be referred to as "tertiary light".

A p-polarized primary light beam is intended to mean a linearly polarized light beam, the polarization direction of which lies in an incidence plane. The incidence plane is spanned by a beam direction of the primary light beam incident on the luminescent body and the associated Fresnel reflection, or for example also by the beam direction of the primary light beam incident on the luminescent body and the associated normal direction of the luminescent material surface at the point of incidence. An s-polarized primary light beam is intended to mean a linearly polarized light beam, the polarization direction of which is perpendicular to the incidence plane described above.

A light generating device may include at least one light source. In the case of a plurality of light sources, their primary light beams may be combined. The light generating device may also include one or more optical elements, for example for beam forming of the primary light beam generated by the at least one light source. The at least one optical element may, for example, include at least one polarizer or at least one polarization filter, for example if the primary light beam emitted by the at least one light source is not yet linearly polarized, e.g. not yet p-polarized.

The Brewster angle $\alpha B$ is defined as $\alpha B = \arctan(n2/n1)$, with $n1$ being the refractive index of air and $n2$ being the refractive index of the luminescent body. Typically, $n1=1$, so that the Brewster angle may then also be described as $\alpha B = \arctan(n2)$. Instead of air, however, any other suitable gas, liquid or transparent solid, for example a sapphire substrate, may also be used.

The Brewster angle $\alpha B$ is, e.g. defined in relation to the surface of the luminescent body at the light spot, in which case the plane of the luminescent body itself may represent an average value over a microstructured surface or surface roughness.

If the luminescent body can be illuminated by a plurality of primary light beams, these may each be incident at the Brewster angle $\alpha B$. They may, for example, be arranged angularly offset in a circumferential direction. The primary light beams may thus also shine onto the luminescent body from different directions at the same Brewster angle $\alpha B$, for example by their being arranged around the luminescent body according to a spherical cap arrangement.

The luminescent body may be simultaneously or intermittently excited reflectively and/or transmissively. In this case, laser wavelengths and the Brewster angles $\alpha B$ resulting therefrom may be equal or different.

It is one configuration that the at least one light generating device includes at least one semiconductor light source. This typically has a small divergence and a high beam intensity.

It is one refinement that the semiconductor light source is configured as a semiconductor laser. This has a particularly small divergence. Furthermore, a laser beam emitted by a semiconductor laser is usually already linearly polarized, so that further polarization-influencing optical units no longer have to be arranged downstream of the semiconductor laser.

The at least one semiconductor laser may, for example, include one or more laser diodes. A plurality of laser diodes may, for example, be arranged as a "laser stack".

The at least one semiconductor laser may, for example, include a multiplicity of laser diodes linearly polarized in the same direction, which are for example arranged in the manner of a matrix and shine onto the same region of the luminescent body or onto different regions of the luminescent body. The laser diodes may emit the same laser wavelength or different laser wavelengths, and each laser diode may be directed at the luminescent material region to be illuminated in such a way that the angle of incidence corresponds to the Brewster angle associated with the respective laser wavelength.

Unconverted primary light may generally be reflected back into the luminescent body by a suitable polarizing reflection arrangement (polarization recycling) at least partially at the same Brewster angle as the Brewster angle of the original incidence, which increases the conversion efficiency of the lighting apparatus.

It is another configuration that the luminescent body consists of composite material having an optically transparent matrix material and luminescent material as a filler. Possible matrix material includes, for example, silicone or water glass. Its refractive index $n2$ typically lies in a range of between about 1.4 and about 1.9.

The Brewster angle $\alpha B$ may then, for example, be matched to the matrix material. In the case of a range of the refractive index $n2$ of between 1.4 and 1.9, this corresponds to the following values:

| n2 | $\alpha B$ |
| --- | --- |
| 1.4 | 54.5° |
| 1.5 | 56.3° |
| 1.6 | 58.0° |
| 1.7 | 59.5° |
| 1.8 | 60.9° |
| 1.9 | 62.2° |

It is another configuration that the luminescent body is a ceramic luminescent platelet. Such a luminescent platelet also has a range of its refractive index n2 between about 1.4 and about 1.9.

It is another configuration that a divergence angle of the at least one polarized primary light beam on a surface of the luminescent body is no more than 10°, e.g. no more than 5°, e.g. no more than 2°, e.g. no more than 1°. In this way, any Fresnel reflection—even taking into account further real influences such as a non-ideally smooth surface of the luminescent body—can be kept very small. This is because the small divergence angle limits deviations of the primary light beam from the Brewster angle to almost negligible amounts. The divergence angle corresponds e.g. to an angle between a beam center, often corresponding to an optical axis, and a beam margin. The beam margin may, for example, be that region of a light beam which has a radiation intensity that is only a factor of 1/e (e being Euler's number) as great as a maximum beam intensity of this light beam.

It is furthermore a configuration that the at least one light generating device and the at least one luminescent body are in a reflective arrangement. In the reflective arrangement, the useful light emitted by the luminescent body (wavelength-converted secondary light or a mixture of wavelength-converted secondary light and primary light scattered or reflected without wavelength conversion) is emitted on the same side as that on which, or in the same half-space as that from which, the primary light is incident. To this end, a reflector may be provided on a side of the luminescent body facing away from the incident primary light. The luminescent body may for example, lie on the reflector. The reflector may, for example, be used as a carrier for the luminescent body, and optionally also as a heat sink.

It is also a configuration that the at least one light generating device and the at least one luminescent body are in a transmissive arrangement. In the transmissive arrangement, or transmitted-light arrangement, the useful light emitted by the luminescent body is emitted on that side lying opposite the side on which the primary light is incident. If the luminescent body lies on a carrier, the latter will be at least partially optically transparent.

It is also a configuration that there is at least one beam-deviating optical unit, e.g. a transmitted-light optical unit, in a primary light path between the at least one light generating device and the at least one luminescent body. In this way a particularly compact structure can be achieved. For example, the primary light beam may initially be shone onto the beam-deviating optical unit with a smaller inclination with respect to the surface of the luminescent body (optionally even perpendicularly to the surface), in order then to be deviated to the Brewster angle by the optical unit. This may be done shortly before the luminescent body. The beam-deviating optical unit at the same time allows effective beam concentration of the useful light usually emitted with a wide angle by the luminescent body, e.g. in a reflective arrangement. To this end, a secondary light path likewise extends through the at least one transmitted-light optical unit.

Particularly simple separation of the primary light beam and the useful light beam may be achieved when the primary light path extends locally limited in cross section in the secondary light path at least between the at least one transmitted-light optical unit and the at least one luminescent body. The useful light beam, or the path thereof, is thus wider than the primary light beam, or the path thereof, and the primary light beam extends only in a small, locally limited part of the secondary light beam. This structure is particularly compact owing to the overlapping light paths, and the useful light is nevertheless for the most part spatially separated from the primary light beam.

It is one refinement that the primary light beam is arranged off-center in relation to an optical axis of the at least one beam-deviating optical unit. This particularly simply allows separation of the highly intense primary light beam and a high-intensity angle range of the useful light, usually oriented perpendicularly to a surface of the luminescent body.

It is furthermore a configuration that the at least one polarized primary light beam can be shone through an optically transparent subregion of a reflector onto a luminescent body located at a focal spot of the reflector. A particularly effective and structurally compact arrangement can be achieved in this way, particularly in order to generate light projection in a far field, for example for image projectors and vehicle headlamps. The effect of the oblique incidence on the luminescent body is that the useful light re-emitted particularly strongly perpendicularly can be fully collected by the reflector. In contrast thereto, in the case of normal incidence of the primary light beam the most intensive useful light range would emerge again without use from the reflector through a transmission window for the primary light beam.

The reflector may generally have at least one transmission window for incidence of at least one primary light beam.

The reflector may, for example, be a spherical reflector (i.e. a reflector having an at least locally spherically shaped reflection surface).

It is furthermore a configuration that the reflector has two focal spots separated from one another. This allows spatially narrowly limitable light output. Thus, the light spot on the luminescent body may lie on one of the two focal spots, while an output optical unit may for example lie on the other focal spot.

It is furthermore a configuration that the reflector is an ellipsoidal reflector. A lighting apparatus equipped with such an ellipsoidal reflector may, for example, include a luminescent body in a reflective arrangement at one of the two focal spots of the ellipsoidal reflector. At the other focal spot, there may for example be an output optical unit. In this case as well, owing to the oblique incidence of the primary light beam at the Brewster angle, a particularly large proportion of the useful light emitted by the luminescent body will be collected by the reflector.

It is furthermore a configuration that the lighting apparatus is intended for use with a vehicle, and is in particular a vehicle headlamp. The vehicle may for example be waterborne, airborne or terrestrial vehicle, for example an automobile, a truck or a motorcycle. The vehicle headlamp may for example be intended to generate lowbeam, highbeam, fog, daytime running and/or cornering light.

FIG. 1 shows a basic structure of a lighting apparatus 1 according to various embodiments as a sectional representation in side view. The lighting apparatus 1 includes at least one lighting apparatus in the form of at least one laser diode 2. The laser diode 2 emits a linearly polarized primary light beam P, as indicated by the polarization direction pol. First, a divergence angle of the primary light beam P emitted by the at least one laser diode 2 is reduced by an optional primary optical unit, for example a lens 3. In a subsequent optical unit 4, for example a lens, the then comparatively wide primary light beam P is focused onto a front side V of a luminescent body 5. The luminescent body 5 may, for example, be in the form of a ceramic platelet or a layer of composite luminescent material. The luminescent body 5 converts the incident primary light beam P into useful light N. The useful light N may consist entirely of wavelength-converted secondary light or of a mixture of secondary light and unconverted primary light. For example, the useful light N may be blue-yellow, or white mixed light consisting of blue primary light and yellow secondary light. Alternatively, it may be purely green, red or yellow secondary light.

The luminescent body 5 is arranged at a distance from the laser diode 2, so that the lighting apparatus 1 constitutes an LARP ("Laser Activated Remote Phosphor") apparatus.

The primary light beam P then strikes a planar front side V of the luminescent body 5 at a Brewster angle αB. The area of the luminescent body 5 illuminated by the primary light beam P will be referred to below as a light spot F. The area of the front side of the luminescent body 5 may, for example, be one square millimeter (1 mm²).

The Brewster angle αB is defined as an angle between a surface normal n of the front side V on the light spot F and an incidence direction, here indicated as horizontal, of the primary light beam P, or a central principal ray H of the primary light beam (bundle) P. In this embodiment, it is assumed that the luminescent body 5 has a refractive index of 1.8, so that the Brewster angle αB=60.95°.

A shape of the light spot F corresponds to a projection of the cross section of the primary light beam P onto the front side V of the luminescent body 5. The shape of the light spot F is elongated compared with the cross section of the primary light beam P, specifically by a factor of 1/cos(αB). The light spot F in this case thus has, with a round cross-sectional shape of the primary light beam P, an elliptical shape with a major axis which is longer than a minor axis by a factor of 2.06.

Figure 2:
FIGS. 2 to 4 show the contours of a plurality of light spots at different Brewster angles in plan view.
Figure 3:
Figure 4:

FIG. 2 shows a light spot F in the case of normal incidence of a primary light beam P, which is circular in cross section, onto the planar surface of the luminescent body 5. The light spot F is likewise circular. FIG. 3 shows an elliptical light spot F in the case of oblique incidence at a Brewster angle αB of 54.5° (corresponding to a refractive index n2 of the luminescent body 5 of 1.4). The (here vertically oriented) major axis is a factor of 1.72 longer than the (here horizontally oriented) minor axis. FIG. 4 shows an elliptical light spot F in the case of oblique incidence at a Brewster angle αB of 62.2° (corresponding to a refractive index n2 of the luminescent body 5 of 1.9). The major axis is longer than the minor axis by a factor of 2.14. An image-side or aspect ratio of the useful light beam N can be adjusted correspondingly by the longitudinal extent of the light spot F. This may, for example, be advantageous for image projections with an aspect ratio of the desired image not equal to 1, for example if the image is intended to have an aspect ratio of 16:9, corresponding to 1.78.

Now referring again to FIG. 1, under ideal conditions (for example with an entirely smooth front side V, accurately constant refractive index of the luminescent body 5 on its front side V, accurately collimated primary light beam P) all of the primary light beam P would enter the luminescent body 5 and there would be no Fresnel reflection RF. This, however, only applies for a p-polarized primary light beam P whose polarization direction lies in an incidence plane of the primary light beam P. This incident plane, which in the representation shown corresponds to the plane of the image, is spanned by an incidence direction of the primary beam P and by the surface normal n at the light spot F.

Under real conditions, however, minor deviations from the ideal conditions occur, for example due to a surface roughness of the luminescent body 5 or a divergence of the primary light beam P. Thus, under real conditions only the central principal ray H of the primary light beam (bundle) P strikes the front side V at the Brewster angle αB. Since the primary light beam P is not ideally collimated, but instead has a divergence angle (possibly intentionally introduced) on the front side V of the luminescent body 5, other component beams of the primary light beam P strike the front side V at an angle slightly different to the Brewster angle αB. Here, a divergence angle is intended in particular to mean the angle at the light spot F between the principal ray H and a component beam at the margin R of the primary light beam P. In this case, it is not fundamentally important whether the primary light beam P concentrates or converges, or expands or diverges, in the direction of the luminescent body 5. Nevertheless, the Fresnel reflections Rf occurring under real conditions can be kept very small.

To this end, it may be particularly advantageous for the divergence angle of the primary beam P on the front side V not to exceed an (absolute) value of 2°, and e.g. not to exceed 1°. Under otherwise ideal conditions, with a divergence angle of 2°, a proportion of the Fresnel reflections Rf in relation to the total beam energy of 0.1% or less will be achieved. In the case of an s-polarization perpendicular to the p-polarization (in the representation shown perpendicular to the plane of the image) the proportion of the Fresnel reflections Rf in relation to the total beam energy, with otherwise equal conditions, is more than 28%. In the case of normal incidence of the primary light beam P onto the front side V, regardless of the direction of the linear polarization, more than 8% of the beam energy will be reflected on the front side V. Even under real conditions, a significant reduction of the radiation loss by virtue of the suppression of the reflection at the surface of the luminescent body 5 is made possible by incidence of the primary light beam P at the Brewster angle.

The useful light N has an at least approximately Lambertian radiation distribution perpendicularly to the surface, so that a maximum radiation intensity of the useful light N occurs in an emission direction parallel to the surface normal n at the light spot F. The primary light beam P and the useful light beam N are thus substantially spatially separated despite the compact and simple structure.

In the case of a reflective arrangement, the useful light N emitted by the lighting apparatus 1 is emitted on the front side V of the luminescent body 5, as indicated by the arrow shown there. To this end, on a rear side B of the luminescent body 5, there may for example be a reflective surface which returns the light emerging on the rear side B back into the luminescent body 5. The luminescent body 5 may, for example, be fastened on a reflective carrier arranged on the rear side B. In order to cool the luminescent body 5, the carrier may for example consist of metal and be configured as a heat sink, or be connected to a heat sink.

In the case of a transmissive arrangement, the useful light N emitted by the lighting apparatus 1 is emitted on the rear side B of the luminescent body, indicated by the arrow shown there. To this end, for example, the luminescent body 5 may be arranged on a transparent carrier, for example a sapphire platelet. The sapphire platelet may in this case also be used effectively as a thermal dissipation element.

After it is emitted from the luminescent body 5, the useful light N is shaped further, e.g. by at least one downstream optical unit (for example comprising at least one lens, at least one reflector and/or at least one aperture, not represented), for example for emission in a desired light emission pattern into a far field. In order to generate variably adjustable image contents, for example on the basis of a matrix-like arrangement of pixels, the downstream optical unit may include an image generator, for example.

Figure 5:
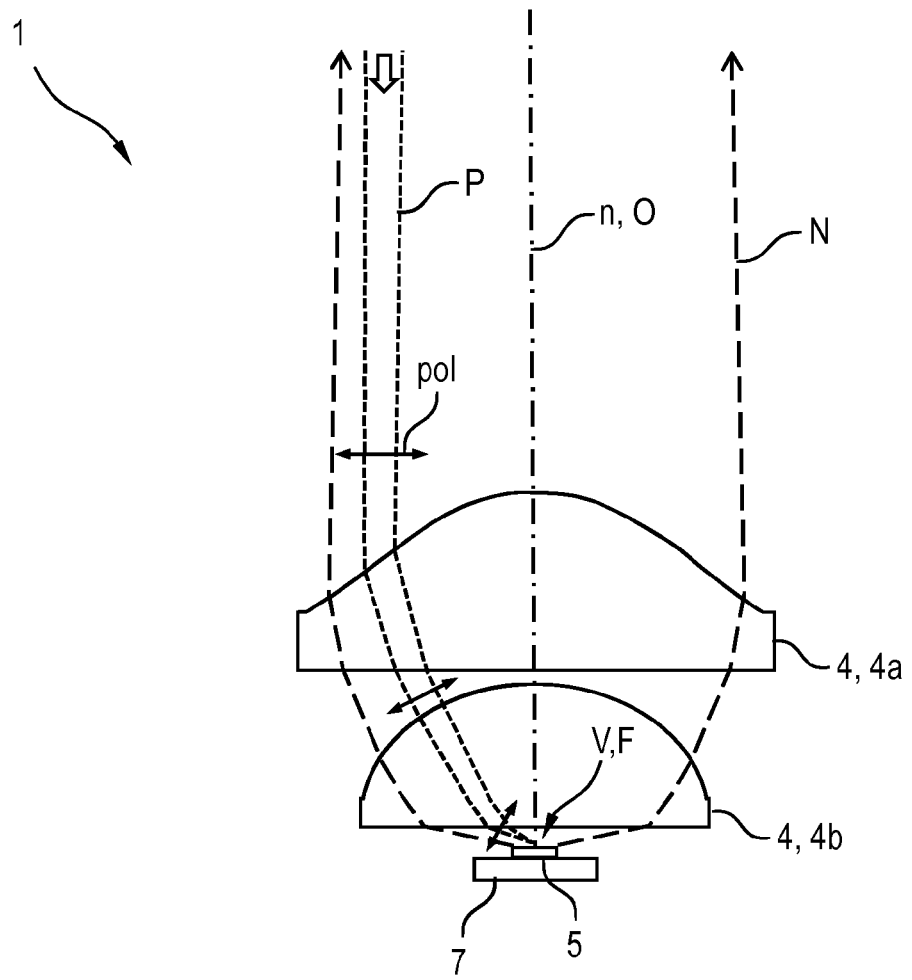
FIG. 5 shows one possible configuration of the lighting apparatus according to various embodiments, with a reflective arrangement, as a sectional representation in side view.

FIG. 5 shows a possible configuration of the lighting apparatus 1 based on a reflective structure. The primary light beam P is first shone in parallel to a normal direction n, specifically onto a deviating optical unit 4 which comprises two successively arranged lenses 4a and 4b. The optical axes O of the two lenses 4a, 4b are congruent with the central surface normal n on the light spot F of the luminescent body 5. The primary light beam P, on the other hand, extends with a lateral offset with respect to the optical axes O, which will also be referred to below as being "off-center". It is deviated by the two lenses 4a and 4b inward in the direction of the optical axes O, so that it strikes the front side V of the luminescent body 5 at the Brewster angle while being p-polarized.

The light emitted again on the front side V of the luminescent body 5 is emitted in a Lambertian fashion, and therefore symmetrically with respect to the surface normal n. The luminescent body 5 is arranged on the rear side on a reflector 7, which reflector 7 may also be used as a heat sink or is connected to a heat sink. The luminescent body 5 may be arranged at a distance from the lens 4a, 4b, or in direct contact therewith.

The useful light N has its highest intensity along the normal direction n. The emitted useful light N is collected and beam-shaped by the two lenses 4a, 4b. The lenses 4a and 4b thus constitute both a focusing optical unit for the primary light beam P and an output optical unit for the useful light beam N, which allows a particularly compact structure.

Because the primary light beam P only extends in a subregion, locally narrowly limited in cross section, of the useful light beam N, which furthermore does not correspond to a region of the highest intensity of the useful light N and may furthermore be inclined relative to the beam of the useful light N, the useful light N can be practically spatially separated from the primary light beam P in a simple way.

The useful light N may, for example, consist entirely of green secondary light which is obtained by full conversion of blue primary light P. The luminescent body 5 then includes blue-green converting luminescent material.

Figure 6:
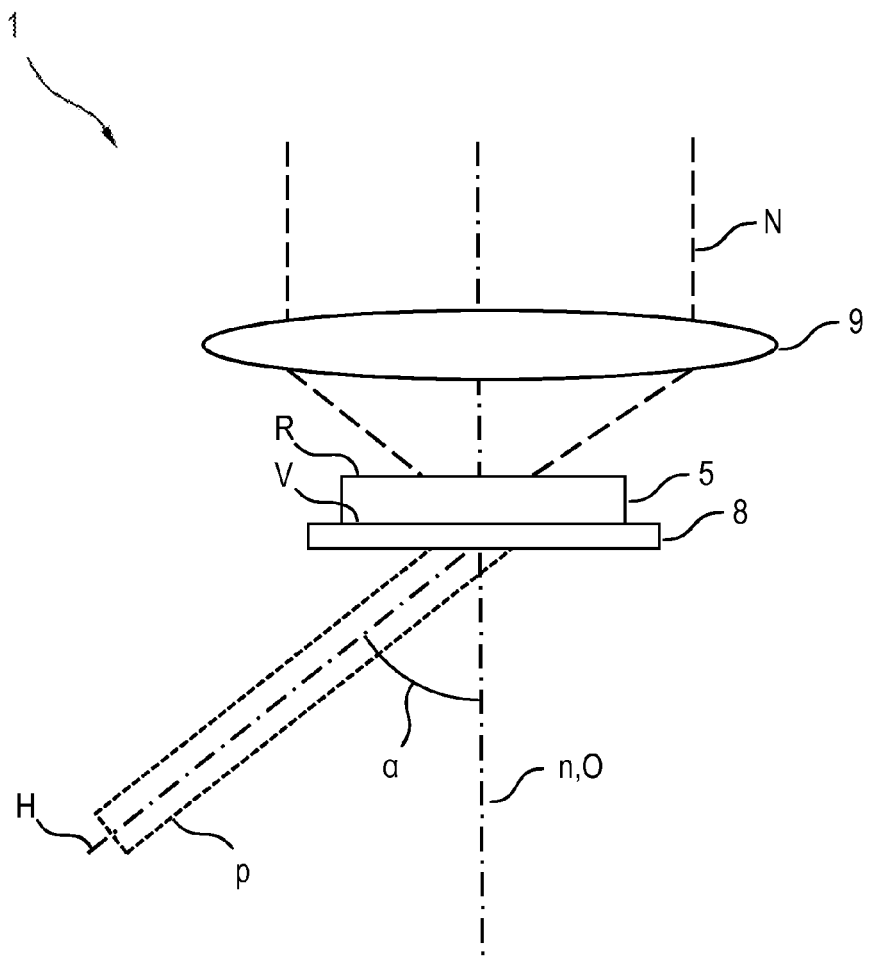
FIG. 6 shows a further configuration of the lighting apparatus according to various embodiments, with a transmissive arrangement, as a sectional representation in side view.

FIG. 6 shows another possible configuration of the lighting apparatus 1, in this case based on a transmissive structure. The luminescent body 5 lies on a transparent carrier in the form of a sapphire platelet 8. The primary light beam P strikes the sapphire platelet 8 at an angle of incidence a such that, after passing through the sapphire platelet 8, it strikes the front side V of the luminescent body 5 at the Brewster angle. In various embodiments, if any change of a beam direction of the primary light beam P due to the sapphire platelet 8 is negligible, the primary light beam P may strike the sapphire platelet 8 at the Brewster angle. Otherwise, the angle of incidence a on the sapphire platelet 8 may differ from the Brewster angle.

The useful light N is emitted on the rear side R of the luminescent body 5, specifically substantially symmetrically with respect to the surface normal n. The useful light N may be beam-shaped by an output optical unit 9.

Figure 7:
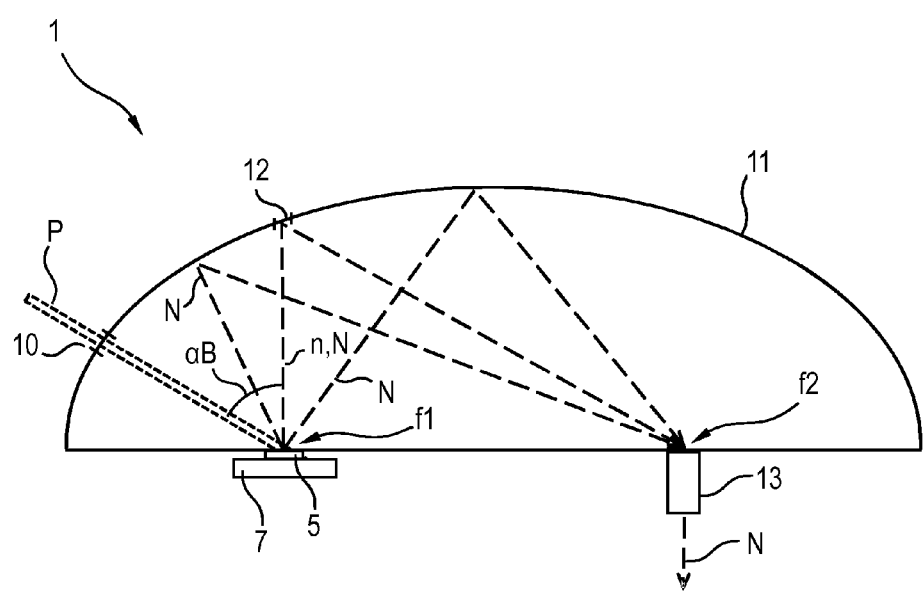
FIG. 7 shows yet another possible configuration of the lighting apparatus according to various embodiments, again with a reflective arrangement, as a sectional representation in side view.

FIG. 7 shows another possible configuration of the lighting apparatus 1, this time again based on a reflective structure.

The primary light P shines through an optically transparent transmissive window 10 into an ellipsoidal reflector 11, specifically onto a luminescent body 5 which lies at a first focal spot f1 of the reflector 11. The primary light P is shone at the Brewster angle αB onto the front side V of the luminescent body 5. The luminescent body 5 may be connected to a reflector 7, which may also be used as a heat sink, on its rear side R. The (e.g. white) useful light N emitted by the luminescent body 5 is essentially emitted in a Lambertian fashion, specifically with the greatest intensity vertically upward along the surface normal n. Since the transmission window 10 lies far to the side of the most intense region of the useful light N, any loss due to useful light N emerging from the transmission window 10 is small.

In the case of normal incidence of the primary light beam P, however, a sizeable proportion of the useful light N would also emerge through the transmission window 12 then lying vertically above the focal spot f1, which would entail a high energy loss. Furthermore, significantly stronger reflections would then also occur on the luminescent body.

The useful light N generated at the focal spot f1 is reflected by means of the reflector 11 onto a second focal spot f2, on which there is an output optical unit 13, for example a collimator, for output of the useful light N.

Although the embodiments have been illustrated and described in detail with reference to the embodiments shown, the embodiments are not restricted thereto and other variants may be derived therefrom by the person skilled in the art without departing from the protective scope of the embodiments.

The reflector may, for example, be composed of a plurality of segment pieces with different configuration.

In general, the terms "one", "a" and "an" may be understood as a singular or plural, particularly in the context of "at least one" or "one or more" etc., so long as this is not explicitly excluded, for example by the expression "precisely one" etc.

Furthermore, a number specification may include the number specified as well as a conventional tolerance range, so long as this is not explicitly excluded.

LIST OF REFERENCES 1 lighting apparatus
2 laser diode
3 lens
4 optical unit
4a lens
4b lens
5 luminescent body
7 reflector
8 sapphire platelet
9 output optical unit
10 transmission window
11 ellipsoidal reflector
12 transmission window
13 output optical unit
α angle of incidence
αB Brewster angle
B rear side of the luminescent body
F light spot
f1 first focal spot of the ellipsoidal reflector
f2 second focal spot of the ellipsoidal reflector
H principal ray of the primary light beam
N useful light
n surface normal
O optical axis
P primary light beam
R margin of the primary light beam
Rf Fresnel reflection
V front side of the luminescent body While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting apparatus, comprising:
   at least one light generating device configured to generate at least one polarized primary light beam; and
   at least one luminescent body, separated from the at least one light generating device, which can be illuminated by the polarized primary light beam;
   wherein the at least one polarized primary light beam strikes a surface of the luminescent body at a Brewster angle, and is p-polarized in relation to this surface.

2. The lighting apparatus of claim 1,
   wherein the at least one light generating device comprises at least one semiconductor light source.

3. The lighting apparatus of claim 2,
   wherein the at least one semiconductor light source comprises at least one semiconductor laser.

4. The lighting apparatus of claim 3,
   wherein the at least one semiconductor laser comprises at least one laser diode.

5. The lighting apparatus of claim 1,
   wherein the luminescent body consists of composite material having an optically transparent matrix material and luminescent material as a filler; and
   wherein the Brewster angle is matched to the matrix material.

6. The lighting apparatus of claim 1,
   wherein the luminescent body is a ceramic luminescent platelet.

7. The lighting apparatus of claim 1,
   wherein a divergence angle of the at least one p-polarized primary light beam on a surface of the luminescent body is no more than 2°.

8. The lighting apparatus of claim 7,
   wherein a divergence angle of the at least one p-polarized primary light beam on a surface of the luminescent body is no more than 1°.

9. The lighting apparatus of claim 1,
   wherein the at least one light generating device and the at least one luminescent body are in a reflective arrangement.

10. The lighting apparatus of claim 1,
    wherein there is at least one deviating transmitted-light optical unit in a path of the primary light between the at least one light generating device and the at least one luminescent body,
    wherein a path of the useful light extends through the at least one transmitted-light optical unit; and
    wherein the path of the primary light extends locally limited in cross section in the path of the useful light at least between the at least one transmitted-light optical unit and the at least one luminescent body.

11. The lighting apparatus of claim 9,
    wherein the at least one p-polarized primary light beam can be shone through an optically transparent subregion of a reflector onto a luminescent body located at a focal spot of the reflector.

12. The lighting apparatus of claim 11,
    wherein the reflector has two focal spots separated from one another.

13. The lighting apparatus of claim 12,
    wherein the reflector is an ellipsoidal reflector.

14. The lighting apparatus of claim 1,
    wherein the at least one light generating device and the at least one luminescent body are in a transmissive arrangement.

15. A vehicle, comprising:
    a lighting apparatus, comprising:
      at least one light generating device configured to generate at least one polarized primary light beam; and
      at least one luminescent body, separated from the at least one light generating device, which can be illuminated by the polarized primary light beam;
      wherein the at least one polarized primary light beam strikes a surface of the luminescent body at a Brewster angle, and is p-polarized in relation to this surface.

16. A vehicle headlamp, comprising:
    a lighting apparatus, comprising:
      at least one light generating device configured to generate at least one polarized primary light beam; and
      at least one luminescent body, separated from the at least one light generating device, which can be illuminated by the polarized primary light beam;
      wherein the at least one polarized primary light beam strikes a surface of the luminescent body at a Brewster angle, and is p-polarized in relation to this surface.

* * * * *

UNITED STATES PATENT AND TRADEMARK OFFICE
CERTIFICATE OF CORRECTION

PATENT NO.        : 9,611,995 B2
APPLICATION NO.   : 14/676832
DATED             : April 4, 2017
INVENTOR(S)       : Martin Daniels Page 1 of 1

It is certified that error appears in the above-identified patent and that said Letters Patent is hereby corrected as shown below:

In the Specification

Column 7, Line 56: Please delete "RE" between the words "reflection" and "This", and write "Rf." in place thereof.

Column 9, Line 44: Please delete the letter "a" between the words "incidence" and "such" and write "α" in place thereof.

Column 9, Line 51: Please delete the letter "a" between the words "incidence" and "on" and write "α" in place thereof.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*